US009190057B2

(12) United States Patent
Hoffmeister et al.

(10) Patent No.: US 9,190,057 B2
(45) Date of Patent: Nov. 17, 2015

(54) SPEECH MODEL RETRIEVAL IN DISTRIBUTED SPEECH RECOGNITION SYSTEMS

(71) Applicant: Amazon Technologies, Inc., Reno, NV (US)

(72) Inventors: Bjorn Hoffmeister, Seattle, WA (US); Hugh Evan Secker-Walker, Newburyport, MA (US); Jeffrey Cornelius O'Neill, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 13/712,891

(22) Filed: Dec. 12, 2012

(65) Prior Publication Data
US 2014/0163977 A1 Jun. 12, 2014

(51) Int. Cl.
*G10L 15/00* (2013.01)
*G10L 15/16* (2006.01)
*G10L 15/22* (2006.01)
*G10L 15/32* (2013.01)
*G10L 15/30* (2013.01)

(52) U.S. Cl.
CPC ............... *G10L 15/22* (2013.01); *G10L 15/30* (2013.01); *G10L 15/32* (2013.01)

(58) Field of Classification Search
None
See application file for complete search history.

(56) References Cited

U.S. PATENT DOCUMENTS

| | | | |
|---|---|---|---|
| 2002/0049535 A1* | 4/2002 | Rigo et al. | 701/211 |
| 2002/0055845 A1* | 5/2002 | Ueda et al. | 704/270 |
| 2003/0009334 A1* | 1/2003 | Printz et al. | 704/256 |
| 2004/0083109 A1* | 4/2004 | Halonen et al. | 704/277 |
| 2004/0203672 A1* | 10/2004 | Crocker et al. | 455/415 |
| 2004/0260549 A1* | 12/2004 | Matsumoto et al. | 704/247 |
| 2005/0131699 A1* | 6/2005 | Fukada | 704/270 |
| 2005/0186941 A1* | 8/2005 | Gault et al. | 455/411 |
| 2005/0261035 A1* | 11/2005 | Groskreutz et al. | 455/569.2 |
| 2006/0058947 A1* | 3/2006 | Schalk | 701/207 |
| 2007/0185714 A1* | 8/2007 | Kim et al. | 704/254 |
| 2007/0192095 A1* | 8/2007 | Braho et al. | 704/232 |
| 2007/0219807 A1* | 9/2007 | Schalk et al. | 704/275 |
| 2008/0071534 A1* | 3/2008 | Johnson | 704/246 |
| 2008/0086260 A1* | 4/2008 | Lee et al. | 701/200 |
| 2008/0177551 A1* | 7/2008 | Schalk | 704/275 |
| 2008/0228483 A1* | 9/2008 | Chen | 704/251 |
| 2008/0270338 A1* | 10/2008 | Adams | 706/48 |

(Continued)

Primary Examiner — Richemond Dorvil
Assistant Examiner — Thuykhanh Le
(74) Attorney, Agent, or Firm — Knobbe, Martens, Olson & Bear, LLP

(57) ABSTRACT

Features are disclosed for managing the use of speech recognition models and data in automated speech recognition systems. Models and data may be retrieved asynchronously and used as they are received or after an utterance is initially processed with more general or different models. Once received, the models and statistics can be cached. Statistics needed to update models and data may also be retrieved asynchronously so that it may be used to update the models and data as it becomes available. The updated models and data may be immediately used to re-process an utterance, or saved for use in processing subsequently received utterances. User interactions with the automated speech recognition system may be tracked in order to predict when a user is likely to utilize the system. Models and data may be pre-cached based on such predictions.

29 Claims, 6 Drawing Sheets

(56) References Cited

U.S. PATENT DOCUMENTS

| | | | |
|---|---|---|---|
| 2009/0204407 A1* | 8/2009 | Shields et al. | 704/270.1 |
| 2009/0318777 A1* | 12/2009 | Kameyama | 600/301 |
| 2010/0079336 A1* | 4/2010 | Skibiski et al. | 342/357.07 |
| 2010/0185392 A1* | 7/2010 | Schalk | 701/209 |
| 2010/0250243 A1* | 9/2010 | Schalk et al. | 704/201 |
| 2010/0312547 A1* | 12/2010 | Van Os et al. | 704/9 |
| 2011/0170527 A1* | 7/2011 | Yamamoto et al. | 370/338 |
| 2011/0288868 A1* | 11/2011 | Lloyd et al. | 704/251 |
| 2011/0307503 A1* | 12/2011 | Dlugosch | 707/758 |
| 2012/0179457 A1 | 7/2012 | Newman et al. | |
| 2012/0215539 A1 | 8/2012 | Juneja | |
| 2012/0253823 A1* | 10/2012 | Schalk et al. | 704/270.1 |
| 2013/0006621 A1* | 1/2013 | Cross et al. | 704/231 |
| 2013/0085753 A1* | 4/2013 | Bringert et al. | 704/233 |

* cited by examiner

_US 9,190,057 B2_

SPEECH MODEL RETRIEVAL IN DISTRIBUTED SPEECH RECOGNITION SYSTEMS

BACKGROUND

Modern speech recognition systems typically include an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

Acoustic models, language models, and other models used in speech recognition (together referred to as speech recognition models), may be specialized or customized to varying degrees. For example, a speech recognition system may have a general or base model that is not customized in any particular manner, and any number of additional models for particular genders, age ranges, regional accents, or any combination thereof. Some systems may have models for specific subject matter (e.g., medical terminology) or even specific users.

Speech recognition systems may be client-based or client-server-based. For example, a computing device such as a laptop computer may include application software and data to process audio input into text output or a listing of likely transcriptions of the audio input. Some speech recognitions accept audio input via a personal or mobile computing device and transfer the audio input to a network-accessible server where the audio input is transcribed or other processing is performed.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
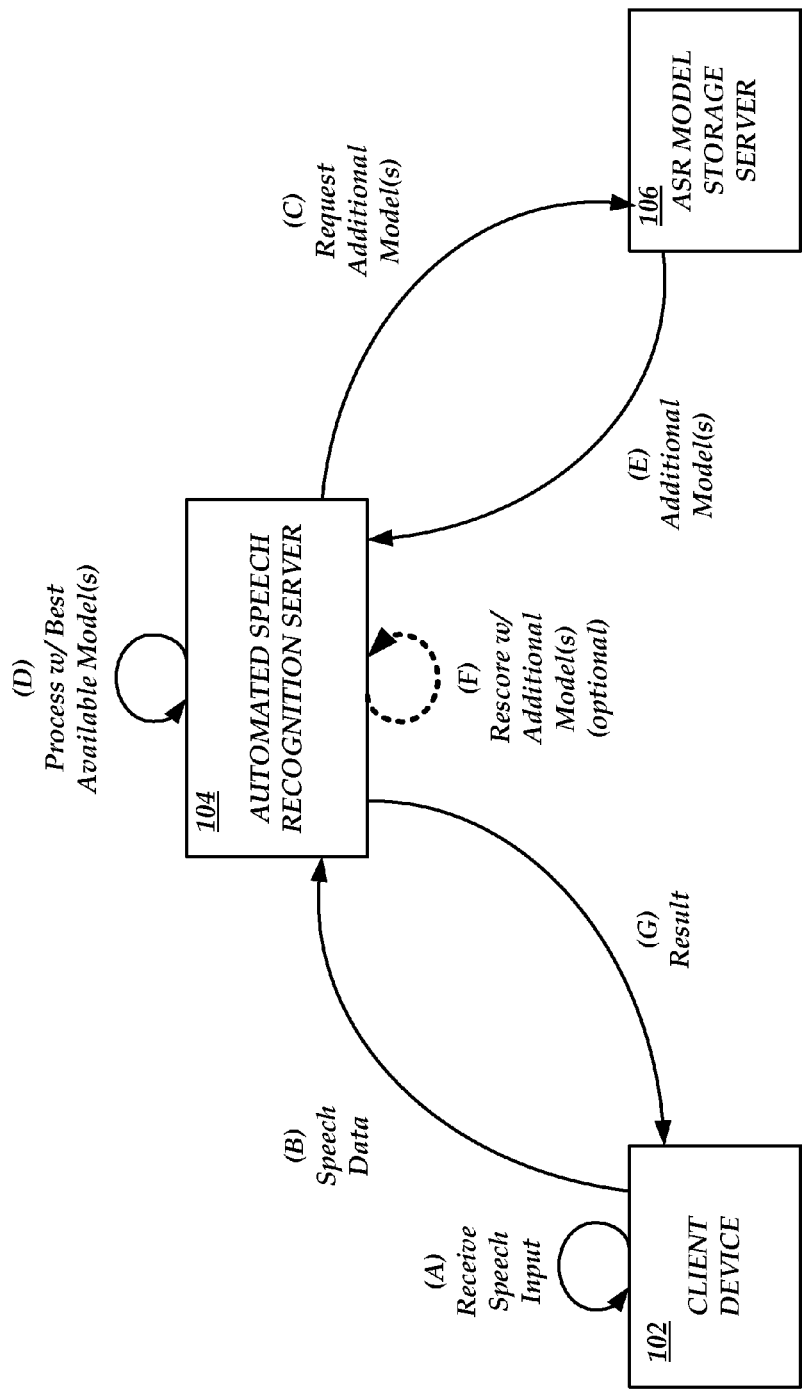
FIG. 1 is a block diagram of an illustrative networked environment in which a distributed speech recognition system may be implemented, showing illustrative interactions between a client device, a speech recognition server, and a model storage server.

Generally described, the present disclosure relates to managing the operation of distributed speech recognition systems that include specialized or customized language models, specialized or customized acoustic models, and other data, collectively referred to as speech recognition models. Speech recognition systems use speech recognition models to process an utterance of a user into a transcription or list of likely transcriptions for the utterance. Some speech recognition systems use generalized or base speech recognition models that apply to a large number of users. In some cases, speech recognition systems may use additional models to provide more accurate results than base models for an individual user or group of users. Such additional models may include or emphasize the vocabulary that a particular user typically uses, or they may more closely match the way that the particular user's speech is represented digitally during speech recognition processing. However, additional models (and speech recognition models in general) can consume a large amount of storage space, and therefore speech recognition systems are limited in the number of models they may store locally on the device at which speech recognition processing takes place. In addition, due to their large size, retrieval of additional models from other devices (e.g., storage servers) may adversely affect user-perceived performance. For example, the time required to retrieve a large additional model from a storage server increases the delay that a user experiences between speaking an utterance and receiving a result.

Aspects of the disclosure relate to asynchronous retrieval of additional speech recognition models for use in performing speech recognition on an utterance. A speech recognition server or engine may request speech recognition models from a data store prior to or in parallel with initializing processing of the utterance such that retrieval of the speech recognition models does not interfere with initial processing. For example, in a multi-threaded system, the thread managing retrieval of the speech recognition models does not block the processing thread.

In some embodiments, a speech recognition system may be implemented as a distributed system that includes components for performing speech recognition (e.g., speech recognition servers) and components for storing additional speech recognition models (e.g., long-term storage servers). A speech recognition server may receive audio input from a user and retrieve, from a storage component, one or more speech recognition models customized or specialized to varying degrees (e.g., one for the user's gender, one for the user's regional accent, one for the particular user, etc.). The speech recognition server may retrieve the additional speech recognition models while also processing the received audio input with a base speech recognition model. In some cases, when the additional models are requested there can be delay until they are received over the network. This can lead to a delay in providing a transcription or performing an action in response to the user's utterance. A user might consider such a delay unacceptable. However, if the additional models are received quickly enough that they may be used while still providing satisfactory performance to the user (e.g., a delay of <100 ms, <500 ms, etc.), then the additional models may be used to improve the accuracy of the speech recognition. For example, the additional speech recognition models may be received prior to beginning processing of the audio input with the base models, and in such cases the additional speech recognition models may be used from the outset. As another example, the models may arrive during processing or after processing of the audio input with base models has completed. The additional models may be used to re-process the audio input or the results of the initial processing if such reprocessing may be done quickly enough to provide satisfactory performance to the user.

In addition to requesting additional speech recognition models before or during processing, the speech recognition server can asynchronously request statistics and other data to update the additional speech recognition models. Additional speech recognition models may be updated after the speech recognition server processes an utterance. The amount of data that is used to update additional speech recognition models is often substantially larger than the amount of data in the additional speech recognition models themselves. Advantageously, by asynchronously requesting the statistics and other data to update the additional speech recognition models, the additional speech recognition models may be updated as soon as the statistics and other data are received. The updated speech recognition models may then be re-used to provide more accurate or otherwise better results. For example, the updated speech recognition models may be used to re-process the current utterance upon which the updates where based, or the updated speech recognition models may be used to process subsequent utterances, or both.

Additional aspects of the disclosure relate to caching additional speech recognition models. By caching the additional speech recognition models, they may be accessed immediately or substantially faster for use in processing subsequently received utterances, providing more accurate results in substantially the same amount of time as processing an utterance with base speech recognition models. For example, a speech recognition server may retrieve additional speech recognition models to process audio data regarding an utterance received from a client device. Whether or not the additional speech recognition models arrive in time to process the first utterance, they may be cached and used to process subsequently received audio data regarding a second utterance.

Further aspects of the disclosure relate to pre-caching additional speech recognition models based on a prediction of which additional models may be requested and when they may be requested. For example, user interactions with a speech recognition system may be monitored such that a component of the speech recognition system may detect a pattern or predict a future time when the user is likely to use the speech recognition system. In anticipation of such use, the additional speech recognition models likely to be requested can be pre-cached (e.g., retrieved from long term storage and stored on a speech recognition server or some network-accessible cache component).

Although aspects of the embodiments described in the disclosure will focus, for the purpose of illustration, on a speech recognition server receiving audio data regarding an utterance and asynchronously retrieving additional speech recognition models to process the audio data, one skilled in the art will appreciate that the techniques disclosed herein may be applied to any number of software processes or applications. For example, a personal mobile device of a user may include a speech recognition engine and asynchronously request additional speech recognition models to use during local processing of an utterance. Various aspects of the disclosure will now be described with regard to certain examples and embodiments, which are intended to illustrate but not limit the disclosure.

With reference to an illustrative example, a user may issue voice commands or otherwise orally interact with a client device, such as a mobile phone or tablet computer. The client device may transmit data regarding the user's utterance to a network-accessible speech recognition server as part of a distributed automated speech recognition ("distributed ASR") system. The speech recognition server may use various types of speech recognition models, such as acoustic models and language models, to process the utterance and transcribe or otherwise determine what the user said. To improve accuracy, the models can be customized to users at various levels. The speech recognition server may use a base model, a model for gender, age, regional accents, terminology, etc. Speech recognition models may also be customized for a particular user or for particular times, days, etc. (e.g., a language model for holiday terminology). Additional speech recognition models may be large and, as a result, a speech recognition server may not have enough storage capacity to store each additional model. A distributed ASR system utilizing additional speech recognition models may implement long term storage for the additional models such that each additional speech recognition model that a speech recognition engine may use can be stored and provided to the speech recognition engine as needed.

User experiences with distributed ASR systems may be defined in terms of both quality (e.g., the accuracy of the results) and perceived performance (e.g., latency and elapsed time between speaking an utterance and receiving a result). Distributed ASR systems endeavor to return results as soon as possible. However, latencies inherent in distributed and other networked systems directly impact the user experience. As a result, any additional delay caused by retrieval of additional speech recognition models from long term storage may result in an unsatisfactory user experience.

In order to minimize the negative impact that usage of additional speech recognition models may introduce into a distributed ASR system, the additional models can be requested asynchronously (e.g., the retrieval of additional speech recognition models does not block execution of speech recognition process with other models, and vice versa). For example, the speech recognition server may utilize multi-threaded processing to request additional models and perform speech recognition with base models in parallel or asynchronously. When an utterance or data regarding an utterance is received, a speech recognition server may determine the identity of the speaker and/or characteristics of the speaker (e.g., gender). The speech recognition server can retrieve additional speech recognition models prior to, in parallel with, or subsequent to processing the utterance. Because retrieving different kinds of additional speech recognition models may have different latencies, the speech recognition server or some other component of the distributed ASR system can request any number of different additional models and use the best one that is received in time to use the model and return a result without adversely affecting the user experience. For example, the speech recognition server may request models for the individual user and also models for the user's gender. If the model for the gender is received first, the speech recognition server can proceed to process the utterance with the gender-specific additional speech recognition model. However, if the model for the specific user is received in time to use it without causing an unsatisfactory delay, the speech recognition server can use that more customized additional model even if it has begun or completed speech recognition processing with another model.

In some embodiments, the content server may reprocess utterances (e.g., a multi-pass ASR system configured to perform speech recognition multiple times on a single utterance). The speech recognition server or some other device performing ASR can have at least one set of base speech recognition models available or could have a small number of additional options available (e.g., gender-specific speech recognition models). After doing a first speech recognition processing pass with available models (e.g., the base models), a second pass can be done if the additional models are retrieved in time.

If no additional or more specific additional speech recognition models are returned after the first pass, the results can be returned to the client device.

For many larger speech recognition models, such as a language models, it may be difficult to retrieve an additional model quickly enough to be able to use it for real-time speech recognition. Caching the additional speech recognition models allows them to be retrieved more quickly. For example, any user-specific or otherwise customized additional speech recognition models may be stored in a data store that has a large capacity but relatively slow response time. Another data store may be used as a cache that returns additional speech recognition models much more quickly. The cache may expire additional speech recognition models based on a least-recently-used ("LRU") criteria.

When a user speaks to the client device, the ASR system can proactively request a user-specific speech recognition model from the cache. If there is a cache miss, the ASR system may proceed with the best available model (e.g., a base model stored on the speech recognition server or a different additional model that is available in the cache). The cache miss will cause the user-specific speech recognition model to be added to the cache. Because users typically utilize ASR systems to process multiple utterances in a short period of time (e.g., a speech recognition session of two or more utterances), any retrieved user-specific models can be available for all but the first interaction.

In addition, the distributed ASR system may record data regarding user interaction with the distributed ASR system. Such data can be used to detect patterns and/or make predictions regarding when the user is likely to use the distributed ASR system. User-specific or other additional speech recognition models may be pre-cached so that they are available at the predicted time. For example, a user may use the distributed ASR system every weekday morning around 8:00 AM while driving to work. After detecting such a pattern, the distributed ASR system may proactively cache additional models for the user on a speech recognition server or in a network cache server (e.g., at 7:30 or 7:55). When the user initiates a speech recognition session around 8:00 AM, the additional models will be available immediately and may be used to process the first utterance in a more accurate manner than with base models but without the latency or retrieval delay otherwise associated with additional speech recognition models.

In some cases, rather than retrieving entire acoustic models or language models, customized statistics and parts of models may be retrieved and used to customize a base acoustic or language model for a particular user. For example, the distributed ASR system may use Constrained Maximum-Likelihood Linear Regression ("CMLLR") transformations, Vocal Tract Length Normalization ("VTLN") warping factors, Cepstral means and variances, weights and vectors for interpolating multiple models, and the like. Advantageously, such parts of models are typically smaller in terms of the amount of data to be transferred than the acoustic or language models with which they can be used. Therefore, retrieval of customized or specialized parts of models can decrease retrieval time more and impact user-perceived performance less than the retrieval of the entire additional acoustic or language models, while providing more accurate results than may be achieved through the use of base models.

Additionally, the speech recognition models and parts of models may be updated or further customized using speech recognition processing results. In order to update the models, large data sets may be required. Asynchronous retrieval of the large data sets, similar to the asynchronous retrieval of speech recognition models, can be implemented in order to obtain the data sets without impacting user-perceived performance. Once the data sets have been retrieved, they may be used to update the additional speech recognition models and parts of models. Moreover, the newly-updated models may be immediately used to process or re-process utterances, depending upon system requirements and user performance expectations.

In some embodiments, the techniques described herein may be used to retrieve additional specialized or customized natural language understanding ("NLU") models instead of, or in addition to, ASR models. Illustratively, additional NLU models (e.g., intent models, named entity models, and gazetteers) may be requested asynchronously or in parallel with processing of text using base NLU models, or during ASR processing that occurs prior to NLU processing. As the additional NLU models are retrieved or otherwise become available, they may be used to re-compute NLU results or they may be used during subsequent NLU processing.

Distributed ASR System Environment

Prior to describing embodiments of processes for managing the use of additional speech recognition models in a distributed ASR system in detail, an example environment in which the processes may be implemented will be described. FIG. 1 illustrates a network environment including a client device 102, an ASR server 104, and an ASR model storage server 106.

The client device 102 can correspond to a wide variety of electronic devices. In some embodiments, the client device 102 may be a mobile device that includes one or more processors and a memory which may contain software applications executed by the processors. The client device 102 may contain a microphone or other audio input device for accepting speech input on which to perform speech recognition. Illustratively, the client device 102 may be a mobile phone, personal digital assistant ("PDA"), mobile gaming device, media player, electronic book reader, tablet computer, laptop computer, and the like. The software of the client device 102 may include components for establishing communications over wireless communication networks or directly with other computing devices.

The ASR server 104 can perform automated speech recognition on a user utterance received from a client device 102. The ASR server 104 can be any computing system that is configured to communicate via a communication network. For example, the ASR server 104 may include a number of server computing devices, desktop computing devices, mainframe computers, and the like. In some embodiments, the ASR server 104 can include several devices physically or logically grouped together, such as an application server computing device configured to perform speech recognition on an utterance and a database server computing device configured to store records and speech recognition models. In some embodiments, the ASR server 104 can include various modules and components combined on a single device, multiple instances of a single module or component, etc.

The ASR model storage server 106 illustrated in FIG. 1 can correspond to a logical association of one or more computing devices for storing speech recognition models and servicing requests for the models via a network. For example, the ASR model storage server 106 can include a database server or storage component corresponding to one or more server computing devices for obtaining and processing requests for speech recognition models from the ASR server 104.

The ASR server 104 may communicate with the client device 102 and/or the ASR model storage server 106 via a communication network. The network may be a publicly accessible network of linked networks, possibly operated by various distinct parties, such as the Internet. In other embodiments, the network may include a private network, personal area network, local area network, wide area network, cable network, satellite network, etc. or some combination thereof, each with access to and/or from the Internet. For example, the ASR server 104 and ASR model storage server 106 may be located within a single data center, and may communicate via a private network, such as a corporate or university network. The client device 102 may communicate with ASR server 104 via the internet. The client device 102 may have access to the Internet via a wired or WiFi connection, or via a cellular telephone network (e.g., a Long Term Evolution or LTE network). In some embodiments, the client device 102 may communicate directly ASR model storage server 106.

In some embodiments, the features and services provided by the distributed ASR system may be implemented as web services consumable via a communication network. In further embodiments, the distributed ASR system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In operation, a client device 102 may receive speech input from a user at (A). The client device 102 may execute application software that is activated by the user to receive voice input. The client device 102 may receive voice input via an integrated microphone, an audio input jack, or some other audio input interface. In some embodiments, the client device 102 may automatically accept voice input when a user begins speaking, even without user activation of a voice input or speech recognition feature.

At (B), the client device 102 sends an audio signal or speech data about the audio input to an ASR server 104. For example, the client device 102 may establish a connection directly with the ASR server 104 or some other component of the distributed ASR system (e.g., a management component) via the Internet. Illustratively, in distributed ASR systems with multiple ASR servers 104, a management component may be implemented to balance the processing load across the multiple ASR servers 104. A client device 102 (or user thereof) may be assigned to or otherwise connected to a particular ASR server 104 the duration of a speech recognition session. In some embodiments, a speech recognition session can include multiple utterances transmitted to the ASR server 104 for processing within a given period of time or within close temporal proximity.

Upon receipt of voice input or data about the voice input, the ASR server 104 can initiate retrieval of various additional speech recognition models from the ASR model storage server 106 at (C). For example, the ASR server 104 may access or receive data regarding the user that made the utterance, such as the user's gender, regional accent, etc. The data may be stored in a user profile, transmitted with the speech data, or obtained in some other manner. The ASR server 104 can then identify one or more additional speech recognition models or sets of statistics that can be used to produce more accurate results than base models or other models that the ASR server 104 has immediate access to. Requests for the additional speech recognition models can be transmitted to the ASR model storage server 106.

At (D), the ASR server 104 can begin processing the utterance using the best speech recognition models, statistics, and other data that the ASR server 104 currently has access to. In some embodiments, the ASR server 104 may store base speech recognition models. In addition, the ASR server 104 may store various additional models that are used often, such as gender-based models. Speech recognition models can consume a large amount of storage space, and therefore in typical implementations an ASR server 104 may store only a small number of the most base or frequently used models.

While the ASR server 104 is processing the utterance using the models to which it currently has access, the additional models and other data requested at (C) may be received at (E). Because the ASR server 104 requested the additional models asynchronously and proceeded to begin processing with other models, the additional models may arrive during or after the ASR server 104 completes processing the utterance with the other models.

Once the additional models are received, they may be used to re-process or re-score the initial results at (F). In many cases, the re-scoring may be performed considerably faster than the initial first-pass speech recognition processing because the first-pass processing likely narrowed down the possible results that are re-scored. As a consequence, the initial results may be re-scored with more applicable models without adding a substantial amount of delay or latency to the overall speech recognition processing for the utterance. If it is determined that the re-scoring will result in unsatisfactory performance or will not noticeably improve the accuracy of the results, or if the models are not received from the ASR model storage server 106 in time, the initial results may be transmitted to the client device 102 at (G). Otherwise, if the results are re-scored, the re-scored results may be transmitted to the client device 102 at (G).

Figure 2:
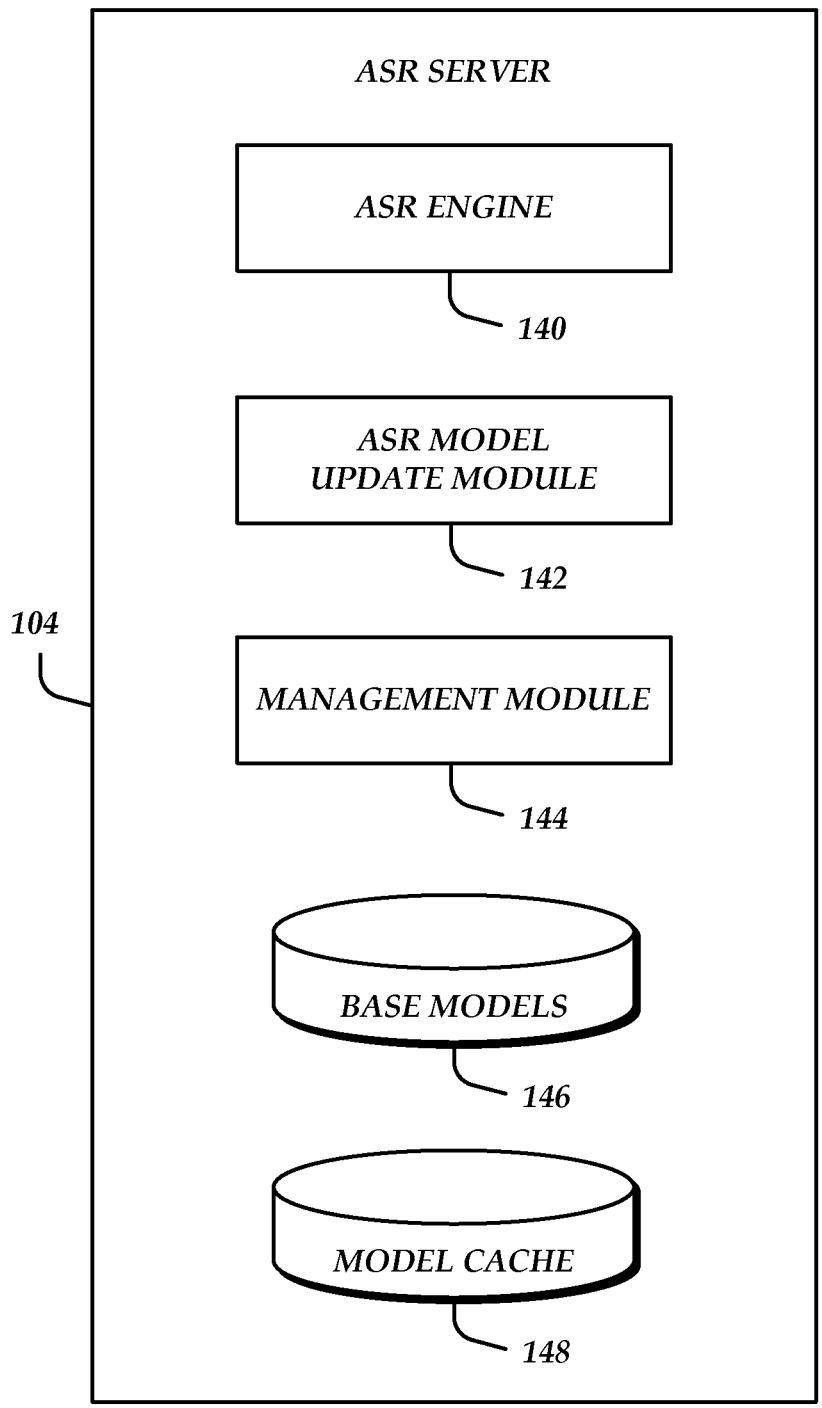
FIG. 2 is a block diagram of an illustrative speech recognition server showing various modules and data stores.

Turning now to FIG. 2, an illustrative ASR server 104 will be described. An ASR server 104 may include an ASR engine 140, an ASR model update module 142, a management module 144, a base models data store 146, and a model cache 148. Each of the modules, components, and data stores of the ASR server 104 may be implemented as a separate device, or various individual modules, components, and data stores may be combined into a single device in various combinations.

The ASR engine 140 can receive input (e.g., a stream of audio input or data regarding a spoken utterance) and, using various speech recognition models and other data, determine the most likely or a list of the most likely transcripts of the utterance, as will be appreciated by those of skill in the art. The ASR model update module 142 can use results from the ASR engine 140 and other data to update additional models and parts of models that may be used to produce more accurate results. For example, the ASR engine 140 may use a set of user-specific or otherwise customized parts of models developed over the course of multiple speech recognition sessions. Illustratively, the parts of models used by the ASR engine 140 may include Constrained Maximum-Likelihood Linear Regression ("CMLLR") transformations, Vocal Tract Length Normalization ("VTLN") warping factors, Cepstral means and variances, weights and vectors for interpolating multiple models, and the like. Advantageously, such parts of models consume a relatively small amount of space, bandwidth, processing capacity, and other resources during storage, transfer, and use compared to the full additional speech recognition models (e.g., language models or acoustic models). In addition, such parts of models still provide improved accuracy to the speech recognition process in comparison to using base speech recognition models alone.

Updating models and parts of models based on the most recent results may require access to a large set of data (e.g., the base data set from which an acoustic model is computed). The ASR model update module 142 or some other module or component of the ASR server 104 can asynchronously retrieve the large data set during or after speech recognition processing by the ASR engine 140. When the data set has been received, it may be used to update the additional user-specific or otherwise customized models and parts of models. In the meantime, the models and parts of models may continue to be used during ASR processing.

The management module 144 may monitor the progress of the ASR engine 140 and the retrieval of additional speech recognition models. If the management module 144 determines that waiting for receipt of an additional model (or part of a model) will not cause an unsatisfactory performance delay, the management module 144 can cause the ASR engine 140 to refrain from providing results to the client device 102 until the ASR engine 140 has the chance to re-score the results with the additional models. If, however, the management module 144 determines that waiting for receipt of the additional models will cause an unsatisfactory performance delay or will not noticeably improve the accuracy of the results, the management module 144 can allow the initial results to be provided to the client device 102 as the final results.

The base models data store 146 can store the base acoustic models and language models that are used by the ASR engine 140 in the absence of more customized, specialized, or otherwise more accurate additional models. Such base models may be customized by user-specific statistics and parts of models to provide more accurate results. In some embodiments, one or more of the most frequently used or widely applicable additional models (e.g., gender-specific models) may be stored in the base models data store 146 of the ASR server 104 so that they do not have to be retrieved from a separate ASR model storage server 106 when needed.

The model cache 148 can be used to store additional models and data that are retrieved for use in speech recognition processing. For example, a cache may be configured to store a predetermined or dynamically determined amount of data. The cache may store as many of the most recently retrieved or most recently retrieved models as it can, while deleting, expiring, or releasing those models which have not been used or requested recently in order to make room for newly received models. Various caching techniques may be applied to the model cache 148, including the use of time to live ("TTL") and least recently used ("LRU") criteria.

Process for Managing Model Retrieval

Figure 3:
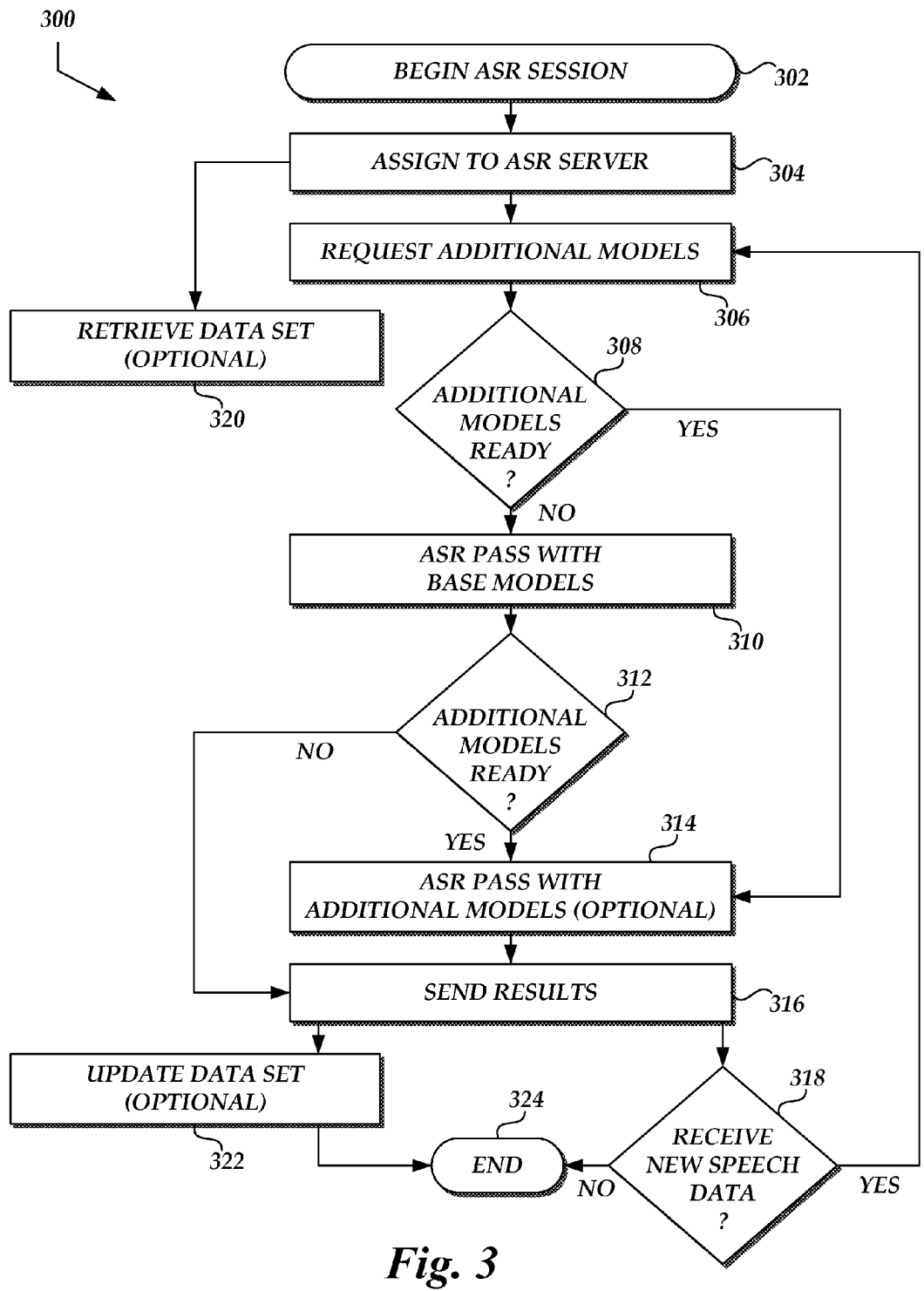
FIG. 3 is a flow diagram of an illustrative process for managing a speech recognition session in a distributed speech recognition system.

With reference now to FIG. 3, a sample process 300 for managing the asynchronous retrieval of speech recognition models and the use of those models will be described. Advantageously, an ASR server 104 may use the process 300 to utilize additional speech recognition models and other data when doing so will improve the accuracy of speech recognition results and not adversely impact perceived performance.

The process 300 begins at block 302. The process 300 may begin automatically upon initiation of an ASR session. The process 300 may be embodied in a set of executable program instructions stored on a computer-readable medium, such as one or more disk drives, of a computing system of the distributed ASR system, such as a load-balancing manager or an individual ASR server 104. When the process 300 is initiated, the executable program instructions can be loaded into memory, such as RAM, and executed by one or more processors of the computing system.

At block 304, the ASR session may be assigned to a particular ASR server 104. Because of the retrieval of additional speech recognition models, subsequent requests from the same user or same client device 102 for ASR processing can be transmitted to the same ASR server 104 until such time that the ASR session ends (e.g., after passage of a period of time or the occurrence of some other triggering event). The ASR server 104 may access or obtain data regarding the user, such as the user's gender, age, regional accent, or the user's identity. Using this demographic or identity data, the ASR server 104 can initiate retrieval of additional speech recognition models at block 306. In some embodiments, as described above, the ASR server 104 may retrieve parts of models, in comparison to a complete additional speech recognition model, for the current user. In such cases, the ASR server 104 may also initiate retrieval of the data set(s) at block 320 that may be used to update the models and parts of models based on the results of ASR processing. In some embodiments, the retrieval of data to update the parts of models is done asynchronously with ASR processing such that the data set is retrieved and updated when resources are available to do so, and when such retrieval and updating does not interfere with processing of the ASR session.

At decision block 308, the ASR server 104 can determine whether the requested additional speech recognition models are available for immediate use. For example, a requested model may be available in the model cache data store 148 or in a separate model cache server of the distributed ASR system, as described in detail below. In such cases, the cached additional model can be accessed and used during the initial ASR processing at block 314, either with or without use of any base models available to the ASR server 104 (e.g., models in the base models data store 146). If no additional speech recognition model is available, or if the ASR server 104 will nevertheless use base speech recognition models, then the ASR server 104 may use base models during an initial ASR processing pass at block 310. In some embodiments, the requested additional speech recognition models may be cached, but the ASR server 104 will use base speech recognition models because of latencies in retrieving the model from the cache.

At decision block 312, reached after an initial ASR processing pass with base speech recognition models, the ASR server 104 can determine whether additional models have become available. If so, the process 300 may proceed to block 314, where the ASR server 104 can perform a second ASR pass (e.g., re-score the initial results) with the additional speech recognition models. In addition, any newly received additional speech recognition models may be cached.

Otherwise, if the additional models have not yet been received, or if it is determined that use of the additional models will cause an unsatisfactory performance delay or no noticeably improve accuracy, the process 300 may proceed to block 316.

At block 316, the ASR server 104 can transmit the final results to the client device 102. In some embodiments, the ASR server 104 may perform some action or cause another device to perform an action, rather than transmitting results to a client device 102. For example, the results from ASR process may be provided to a natural language understanding ("NLU") component that is configured to determine a user's intent from the user's utterance. Based on the user's intent (e.g., get directions, book a flight, initiate voice dialing), the ASR server 104 can perform some action.

After sending results to the client device 102 (or causing performance of some other action), the ASR server 104 may wait for additional utterances to process during the same ASR session at decision block 318. If another utterance is received the process 300 can return to block 306. Otherwise, if another utterance is not received for a period of time or if another triggering event occurs (e.g., a user affirmatively ends an ASR session, such as by powering down the client device 102), the process 300 can end at block 324.

In addition to waiting for additional utterances, the ASR model update module 142 or some other component of the ASR server 104 can update a data set at block 322 based on the results of the ASR processing. The update process can utilize the data sets retrieved asynchronously at block 320. The updated data set may then be cached, transmitted to the ASR model storage server 106, used during a secondary ASR processing pass, etc. In some embodiments, additional models or parts of models may be updated or re-computed based on the updated data sets as soon as ASR results are available with which to update the data sets, such as in parallel with block 316 or directly after block 314.

Process and Architecture for Caching Models

Figure 4:
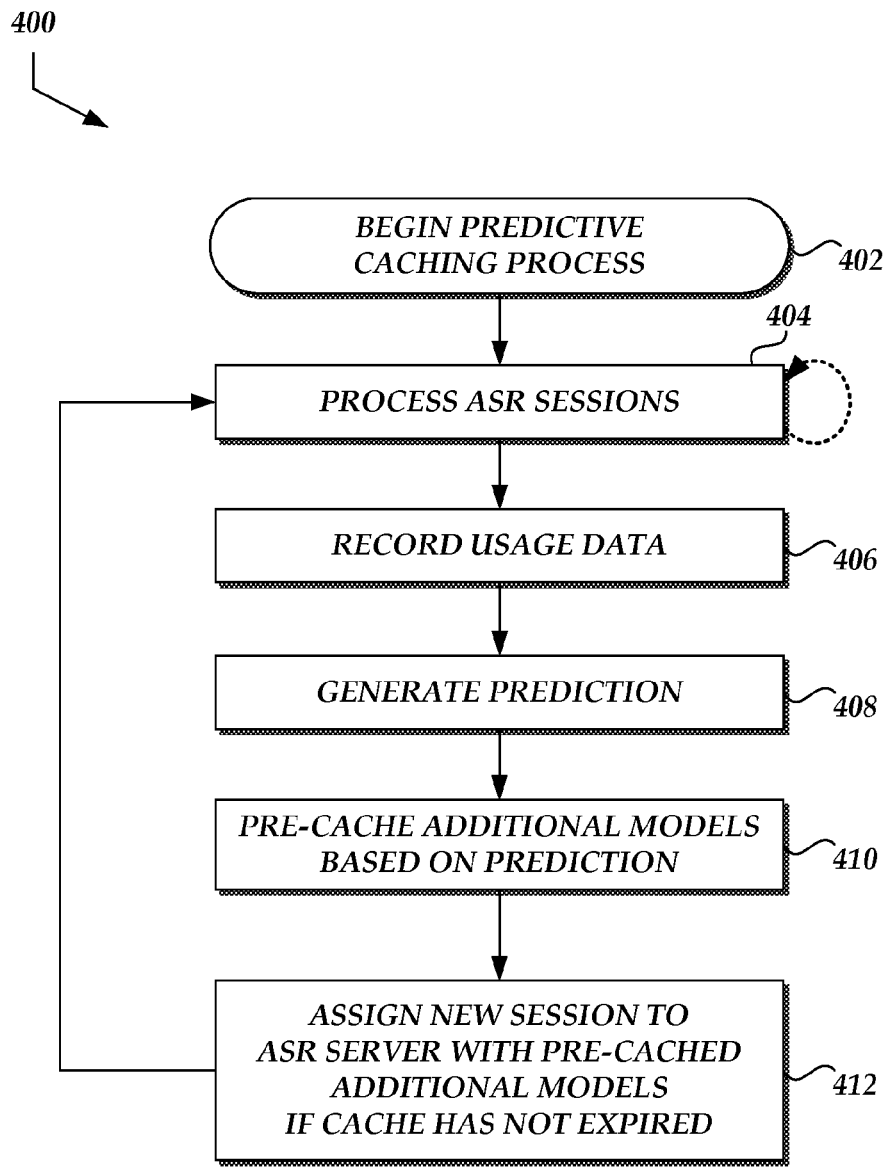
FIG. 4 is a flow diagram of an illustrative process for utilizing pre-caching of models in a distributed speech recognition system.

Turning now to FIG. 4, a sample process 400 for pre-caching additional speech recognition models based on predictions of user activity will be described. Advantageously, the process 400 may be used to analyze prior user activity, predict when the user is likely to utilize the distributed ASR system, and pre-cache additional models such that they are ready for immediate or substantially immediate use at the predicted time.

The process 400 begins at block 402. The process 400 may begin automatically upon power up of an ASR server 104 or some other component of a distributed ASR system, or it may be manually initiated. The process 400 may be embodied in a set of executable program instructions stored on a computer-readable medium, such as one or more disk drives, of a computing system with which a distributed ASR system is associated. When the process 400 is initiated, the executable program instructions can be loaded into memory, such as RAM, and executed by one or more processors of the computing system.

At block 404, the distributed ASR system may process speech recognition sessions as described above. At block 406, usage data regarding ASR sessions of particular users may be recorded as the ASR sessions are processed. For example, the management module 144 of an ASR server 104 hosting a speech recognition session may record data regarding the user or client device 102, including the date and time of the ASR request, the content of the results, the subject or context of the request, and the like.

At block 408, the management module 144 or some other module or component of the distributed ASR system can detect a pattern in the recorded data or determine a prediction regarding when a user is likely to access the distributed ASR system. For example, a particular user may regularly transmit speech data to the distributed ASR system for processing on weekday mornings at or around 8:00 AM. A component of the distributed ASR system may detect such a pattern and, in response, predict that the user will again transmit speech data at 8:00 AM on the next weekday morning. Further, the user may routinely transmit voice commands regarding global positioning system ("GPS") directions or music playback during those 8:00 AM sessions. The prediction may be made more specific by including such details. Additional speech recognition models that are targeted at such activities may be cached based on the detailed prediction.

At block 410, the distributed ASR system may pre-cache additional models for the user shortly before 8:00 of the next weekday morning in anticipation of the user initiating an ASR session. For example, the user may be proactively assigned to a particular ASR server 104 at 7:55 AM or 7:59 AM, before the user initiates an ASR session. Additional models for the user may be pre-cached at the assigned ASR server 104 so that they may be used immediately when the user initiates a session. For example, the models may be stored in the model cache 148 of the ASR server 104. The models selected for pre-caching may be selected based user demographics or identity, subject matter of the predicted session, some combination thereof, etc. In some embodiments, the additional models may be cached at an intermediate cache between the ASR model storage server 106 and the ASR server 104, as described in detail below. In such cases, the user may not be proactively assigned to a particular ASR server 104 because multiple servers may retrieve the cached models from the intermediate cache.

In some embodiments, the time at which additional models are to be cached may be calculated based on a distribution of the user's previous access times, rather than a projection of a specific average or likely time of access. The calculation may be made such that a time is selected that will result in the additional models being cached at a time that precedes a threshold amount or percentage of the user's previous or projected access times. Returning to the example above, the user may typically initiate an ASR session around 8:00, but the actual distribution of times may extend from 7:30 AM to 8:30 AM. The management module 144 may determine that caching the additional models at 7:30 AM and assigning the user to the particular ASR server 104 at that time will result in the additional models being available for 90% or 99% of the user's "8:00 AM" ASR sessions.

At block 412, the user may initiate an ASR session with the distributed ASR system. A load balancing component or some other component of the distributed ASR system may determine that the user has already been associated with a particular ASR server 104 for the session, and utterance data may be sent to the proactively assigned ASR server 104 if the cache has not expired or if the user has not unexpectedly initiated an ASR session after a threshold period of time has passed. For example, if the user initiates the session at a time between 7:30 AM and 8:30 AM, then the user may connect to the proactively assigned ASR server 104 and realize the benefits of pre-caching. However, if the user does not initiate the session until 9:00 AM, or if the cached models have been released to make room for more recently requested or used models, then the user's ASR session may be processed as any other user's ASR session, for example as described above with respect to FIG. 3.

In some embodiments, speech recognition models may be predicatively loaded or pre-cached based on recent user interactions or environmental factors. For example, a client device 102 may monitor input from a microphone and be configured to recognize a certain word or phrase spoken by the user to initiate an ASR session without physical interaction with the device (e.g., without pressing a button or interacting with a touch screen). In some cases, the audio input from the microphone may be transmitted to the distributed ASR system when certain conditions are met (e.g., a preliminary analysis indicates that it is an utterance as opposed to environmental noise) to determine whether the user uttered the word or phrase indicating the initialization of an ASR session. In some cases, a client device 102 may monitor a room for the presence of a user, as a user entering a room may soon speak to the client device 102. When the client device 102 detects the presence of the user (e.g., using sensors, using image processing on a video signal, or using signal processing on an audio signal) a message may be sent to the distributed ASR system to indicate that a user may soon initiate speech recognition with the client device 102. In these and other cases, additional speech recognition models may be loaded for the user before a full utterance is transmitted to the distributed ASR system for processing.

Figure 5A:
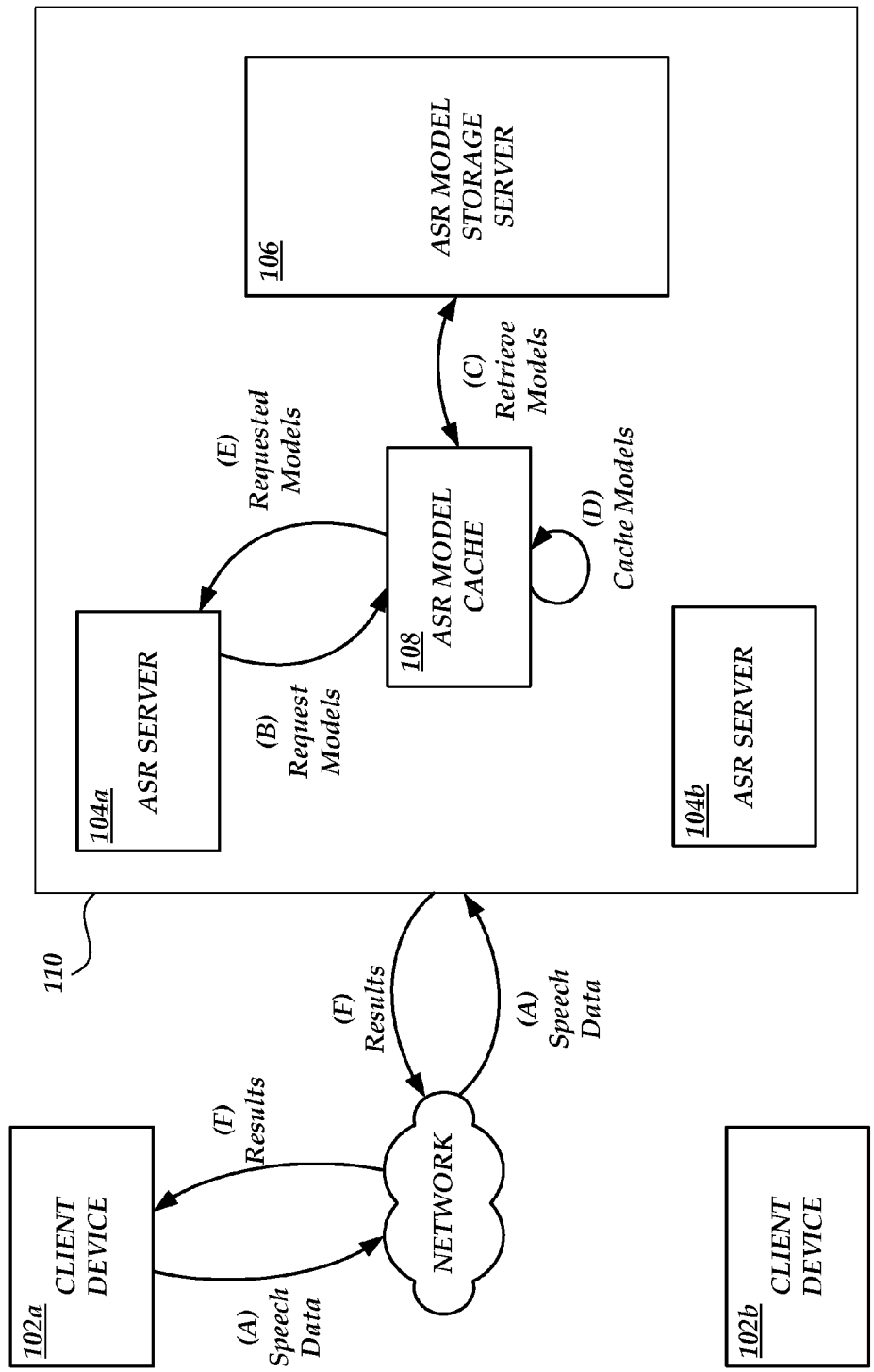
FIGS. 5A and 5B are block diagrams of illustrative interactions between a client device, a speech recognition server, a model cache, and a model storage server.
Figure 5B:
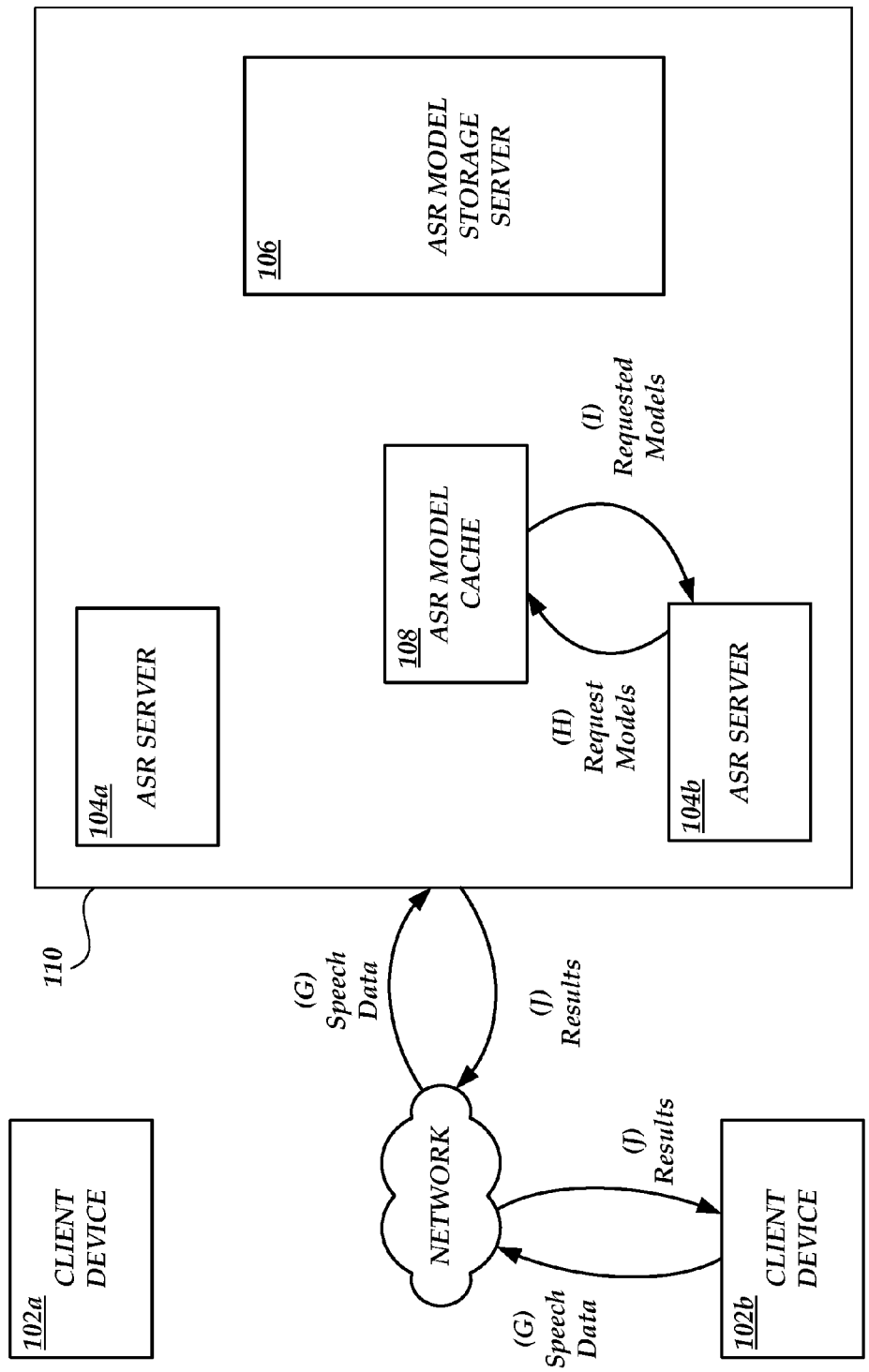

FIGS. 5A and 5B show an illustrative architecture for multi-tiered ASR model storage and caching in a distributed ASR system 110. The distributed ASR system 110 may include multiple ASR servers 104a, 104b, a long-term ASR model storage server 106, and a high-speed ASR model cache 108. The ASR servers 104a, 104b may be located closer to the high-speed ASR model cache 108 than they are to the ASR model storage server 108, measured in either physical proximity or in terms of the amount of time or the number of network hops to required to exchange communications. In addition, the ASR model cache 108 may utilize different hardware that provides faster performance but less capacity than the ASR model storage server 106. In some embodiments, a distributed ASR system 110 may include multiple ASR model caches 108, such as one ASR model cache 108 for every n ASR severs 104, where n may be any number.

A client device 102a may send speech data to the distributed ASR system 110 for processing at (A). Requests for additional speech recognition models may be made from an ASR server 104a to an ASR model cache 108 at (B) instead of to the ASR model storage server 106. If the ASR model cache 108 has the requested model available, then the cached model may be returned to the ASR server 104a significantly faster than it would take to retrieve the speech recognition model from the long-term ASR model storage server 106. If the ASR model cache 108 does not have the requested model, then the ASR model cache 108 may retrieve the requested model from the ASR model storage server 106 at (C), cache a copy of the speech recognition model at (D), and forward a copy to the requesting ASR server 104a at (E). Various caching techniques may be applied by the ASR model cache 108, including the use of time to live ("TTL") and least recently used ("LRU") criteria. The ASR server 104a may transmit results to the client device 102a at (F) or perform some action based on the ASR results.

Advantageously, subsequent requests for the newly cached speech recognition model may be serviced from the ASR model cache 108 rather than from the ASR model storage server 108. For example, the client device 102a may submit speech data to the same ASR server 104a or a different ASR server 104b, and in either case additional speech recognition models may be retrieved from the ASR model cache 108 without requiring retrieval from the ASR model storage server 106. As another example, speech data may be received from a different client device 102b and processed by the same ASR server 104a or a different ASR server 104b. As seen in FIG. 5B, a second client device 102b may transmit speech data to the distributed ASR system 110 at (G). A second ASR server 104b may process the speech data, requesting the same additional speech recognition models from the ASR model cache 108 at (H). Because the models have been previously cached, the requested models may be returned to the ASR server 104B at (I) without retrieving them from the ASR model storage server 106. The ASR server 104b may transmit results to the client device 102b at (J) or perform some action based on the ASR results.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    a computer-readable memory storing executable instructions; and
    one or more processors in communication with the computer-readable memory, wherein the one or more processors are programmed by the executable instructions to:
        receive, from a client device, audio data comprising a user utterance;
        determine that an additional speech recognition model is not available;
        perform first speech recognition processing on the audio data using a base speech recognition model to produce first speech recognition results;
        request the additional speech recognition model from a network-accessible data store, wherein the request is initiated prior to completion of the first speech recognition processing;
        receive the additional speech recognition model from the network-accessible data store;
        perform second speech recognition processing using the additional speech recognition model and using at least one of the audio data or the first speech recognition results;
        transmit a response to the client device based at least in part on the second speech recognition processing;
        remove the additional speech recognition model from a cache;
        determine a predicted time at which the client device is predicted to initiate a subsequent speech recognition session; and
        pre-cache, in the cache, the additional speech recognition model at substantially the predicted time.

2. The system of claim 1, wherein the base speech recognition model comprises at least one of a general acoustic model, a gender-specific acoustic model, or a general language model, and wherein the additional speech recognition model is selected based at least in part on a characteristic of a user associated with the user utterance.

3. The system of claim 1, wherein the one or more processors are further programmed by the executable instructions to:
    receive, from the client device, second audio data comprising a second user utterance;
    determine that the additional speech recognition model is available; and
    perform speech recognition processing on the second audio data using the additional speech recognition model.

4. The system of claim 1, wherein the one or more processors are further programmed by the executable instructions to use multi-threaded processing to retrieve the additional speech recognition model in parallel with performance of the first speech recognition processing.

5. The system of claim 1, wherein the executable instructions that program the one or more processors to determine the predicted time comprise instructions to detect a pattern in data regarding times of prior speech recognition sessions.

6. A computer-implemented method comprising:
    under control of one or more computing devices configured with specific computer executable instructions,
        performing, by the one or more computing devices, first speech processing on audio data regarding an utterance of a user to produce speech processing results;
        requesting, by the one or more computing devices, speech processing data from a network-accessible data store, wherein the request is initiated prior to completion of the first speech processing;
        receiving, by the one or more computing devices, the speech processing data from the network-accessible data store;
        performing, by the one or more computing devices, second speech processing using the speech processing data and at least one of the audio data or the speech processing results;
        removing, by the one or more computing devices, the speech processing data from a storage of the one or more computing devices;
        determining, by the one or more computing devices, a predicted time at which the user is predicted to initiate a subsequent speech recognition session; and
        receiving, by the one or more computing devices, the speech processing data at substantially the predicted time.

7. The computer-implemented method of claim 6, further comprising:
    selecting speech processing data to request based at least in part on a characteristic of the user.

8. The computer-implemented method of claim 7, wherein the characteristic of the user comprises a gender, age, regional accent, or identify of the user.

9. The computer-implemented method of claim 6, wherein the speech processing data comprises at least one of an acoustic model, a language model, language model statistics, Constrained Maximum-Likelihood Linear Regression ("CMLLR") transforms, Vocal Tract Length Normalization ("VTLN") warping factors, Cepstral mean and variance data, an intent model, a named entity model, or a gazetteer.

10. The computer-implemented method of claim 9, further comprising:
    requesting statistics for updating the speech processing data, wherein the request for statistics is initiated prior to completion of the first speech processing.

11. The computer-implemented method of claim 10, further comprising updating the speech processing data based at least in part on the statistics and results of the second speech processing.

12. The computer-implemented method of claim 6, further comprising:
    receiving second audio data regarding a second utterance of the user;
    retrieving the speech processing data from a cache; and
    performing speech processing on the second audio data using the speech processing data.

13. The computer-implemented method of claim 6, further comprising storing the speech processing data at a cache server separate from the network-accessible data store at a time preceding the predicted time.

14. The computer-implemented method of claim 6, wherein receiving the speech processing data at substantially the predicted time comprises retrieving a cached copy of the speech processing data.

15. The computer-implemented method of claim 6, further comprising:
   receiving the audio data from a client device operated by the user; and
   transmitting a response to the client device, the response based at least in part on the second speech recognition processing.

16. The computer-implemented method of claim 6, further comprising:
   performing an action based at least in part on the second speech recognition processing.

17. The computer-implemented method of claim 6, further comprising detecting a pattern in data regarding times of prior speech processing sessions, wherein determining the predicted time is based at least partly on the pattern.

18. The computer-implemented method of claim 6, wherein a first computing device of the one or more computing devices performs the second speech processing using the speech processing data, and wherein a second computing device of the one or more computing devices receives the speech processing data at substantially the predicted time.

19. A non-transitory computer readable medium comprising executable code that, when executed by a processor, causes a computing device to perform a process comprising:
   performing first speech recognition processing on audio data regarding an utterance of a user to produce speech recognition results;
   requesting speech recognition data from a network-accessible data store, wherein the request is initiated prior to completion of the first speech recognition processing;
   receiving the speech recognition data from a network-accessible data store;
   performing second speech recognition processing using the speech recognition data and at least one of the audio data or the speech recognition results;
   removing the speech recognition data from a storage of the computing device;
   determining a predicted time at which the user is predicted to initiate a subsequent speech recognition session; and
   receiving the speech recognition data at substantially the predicted time.

20. The non-transitory computer readable medium of claim 19, wherein the process further comprises:
   selecting speech recognition data to request based at least in part on one of a date or time at which the audio data is received.

21. The non-transitory computer readable medium of claim 19, wherein the process further comprises:
   selecting speech recognition data to request based at least in part on a characteristic associated with the user.

22. The non-transitory computer readable medium of claim 21, wherein the characteristic associated with the user comprises one of a gender, age, regional accent, identify of the user, or identity of a group with which the user is associated.

23. The non-transitory computer readable medium of claim 19, wherein the speech recognition data comprises an acoustic model, a language model, language model statistics, Constrained Maximum-Likelihood Linear Regression ("CMLLR") transforms, Vocal Tract Length Normalization ("VTLN") warping factors, Cepstral mean and variance data, an intent model, a named entity model, or a gazetteer.

24. The non-transitory computer readable medium of claim 23, wherein the process further comprises:
   requesting statistics for updating the speech recognition data, wherein the request for statistics is initiated prior to completion of the first speech recognition processing.

25. The non-transitory computer readable medium of claim 24, wherein the process further comprises:
   updating the speech recognition data based at least in part on the statistics and results of the second speech recognition processing.

26. The non-transitory computer readable medium of claim 19, wherein receiving the speech recognition data at substantially the predicted time comprises retrieving a cached copy of the speech recognition data.

27. The non-transitory computer readable medium of claim 19, wherein the process further comprises:
   receiving the audio data from a client device operated by the user; and
   transmitting a response to the client device, the response based at least in part on the second speech recognition processing.

28. The non-transitory computer readable medium of claim 19, wherein the process further comprises:
   performing an action based at least in part on the second speech recognition processing.

29. The non-transitory computer readable medium of claim 19, wherein receiving the speech recognition data at substantially the predicted time comprises receiving the speech recognition data from a second computing device separate from the computing device.

* * * * *